Jan. 26, 1965 G. W. KREITER ETAL 3,167,634
SEAM WELDING MEANS
Original Filed Feb. 26, 1962
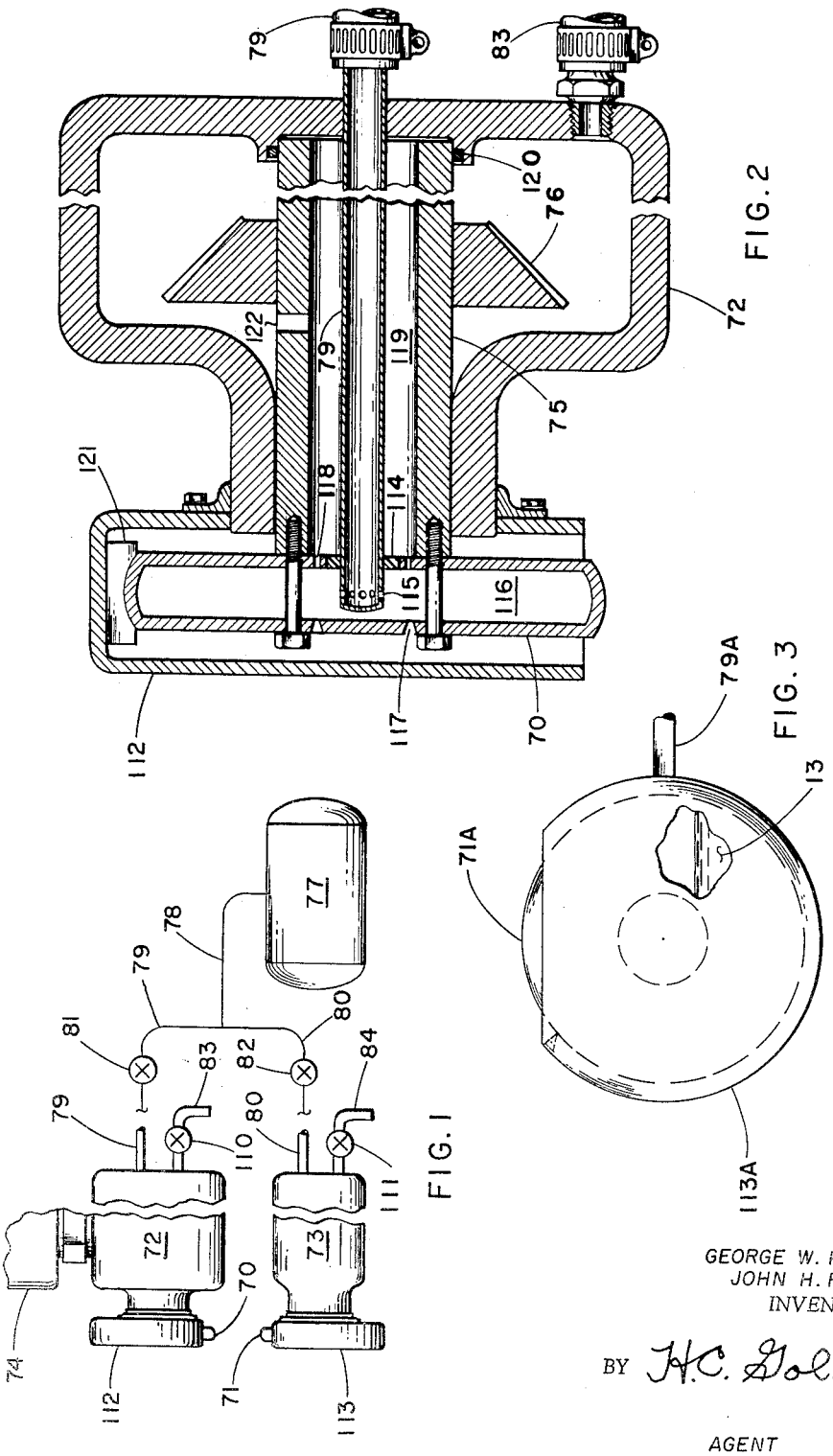
GEORGE W. KREITER
JOHN H. RIZA
INVENTORS
BY H.C. Goldwire
AGENT United States Patent Office 3,167,634
Patented Jan. 26, 1965

3,167,634
SEAM WELDING MEANS
George W. Kroffer, Irving, and John H. Riza, Grand
Prairie, Tex., assignors to Ling-Temco-Vought, Inc.,
Dallas, Tex., a corporation of Delaware
Original application Feb. 26, 1962, Ser. No. 175,411, now
Patent No. 3,119,007, dated Jan. 21, 1964. Divided
and this application July 5, 1962, Ser. No. 216,695
4 Claims. (Cl. 219—34)

This invention relates to the joining of electrically conductive parts by resistance welding and particularly to a means for seam welding together parts whose properties preclude or render unsatisfactory their joining by conventional seam welding means and methods.

The present application has been divided from application Serial No. 175,411 filed February 26, 1962, which issued as U.S. Patent Number 3,119,007 dated January 21, 1964.

The high melting points, relatively excellent strengths, and other favorable characteristics of the refractory metals, including molybdenum, columbium, tungsten, tantalum, and the like, tend to make these metals of great value in high-temperature usages such as for the outer surfaces of hypersonic aircraft, for certain industrial applications, etc. In many applications, it would be desirable to join refractory metal sheets or similar members by means of seam welding, but this has presented serious difficulties similar to those described with reference to spot welding in the parent application.

The result of efforts that have been expended in attempts to seam weld sheets or plates of the metal molybdenum, for example, without producing excessive brittleness or loss of strength in the weld area are similar to electrode problems with spot welds described in the parent application. In particular, the use of seam welding wheels for the joining of molybdenum sheets or plates has been rendered unsatisfactory by electrode deformation and/or sticking (softening or melting of the periphery of the seam-welding wheel followed by adherence to the molybdenum). While these problems are not limited to seam welding in molybdenum, this material is more than typical of a refractory metal presenting seam welding difficulties. Much of the following discussion, therefore, will be devoted to the specific example of seam welding molybdenum plates or sheets, and it will be understood that the principles set forth apply also to other refractory metals.

Electrode wheel deformation and sticking are the heretofore largely unavoidable consequences of two of the very attributes rendering molybdenum extremely desirable in high-temperature environments, namely its high melting point and high thermal and electrical conductivities. Seam welding, including roll spot welding, is a resistance-welding process wherein coalescence is produced by the heat obtained from resistance of the work to the flow of electric current through the work parts held together under pressure by circular electrodes. The resulting seam weld is analogous to a series of spot welds, which may be overlapping, made progressively along a joint by rotating the electrodes. The high conductivity of molybdenum requires that an extremely heavy welding current be employed to bring about the necessary, localized melting. Unfortunately, the conductivity of the molybdenum is so near that of the wheels, even when the latter are made of an alloy of high copper content, and the melting point of the wheels is so low compared to that of the molybdenum, that the necessary current results in a softening or melting of the periphery of the wheels, thus welding them to the molybdenum. Where actual sticking does not occur, the wheels nonetheless are quickly deformed by overheating and the welding pressure.

Whereas difficulties including wheel deformation and sticking have prevented the formation of seam welds in molybdenum, reported experiences in the attempted spot welding of molybdenum have indicated that the seam welds, even if they could be formed, would be completely unsatisfactory for structural use. Much of the strength of molybdenum is imparted to it by strain hardening. A weld nugget, formed after strain hardening, is made of recrystalized metal and hence is of a coarse-grained structure of lower strength and virtually no ductility at room temperature. Because of the great thermal conductivity of molybdenum, however, bringing the metal to a temperature sufficient for melting in the desired nugget location results in heating a comparatively large surrounding area to a temperature at which coarse-grained re-crystallization occurs without melting. This heat-affected area, while originally of the same grain structure as the remainder of the sheet, is practically of no ductility and is of greatly inferior strength; in addition, the heat-affected area is apt to become very brittle by action of impurities (nitrides, carbides, etc.) precipitated, at high temperatures, at the grain boundaries. In spot welding, it has been found that the deleterious effects of resistance welding on molybdenum are so extensive that failure, in tension shear, nearly always occurs in the heat-affected zone outside the nugget rather than in the nugget. While it might be expected that the large-grained nugget would be of lowered strength, it is apparent that the strength of the remainder of the heat-affected zone is even lower and that the overall strength of the molybdenum sheet has been decimated. Strength in the heat-affected region is also much reduced by visible as well as microscopic cracking which occurs in the weakened, brittle, heat-affected zone extending well beyond the electrode area.

It is, accordingly, a major object of the present invention to enable the successful seam welding of the refractory metals including tungsten, tantalum, and columbium and especially including molybdenum.

Related objects are to enable the seam welding of molybdenum and the like without electrode wheel sticking and to greatly increase the strength of resistance welded articles of molybdenum and the like.

Another object is to increase the ductility in the weld region in a resistance welded article made of a refractory metal.

Yet another object is to provide an improved apparatus for seam welding which is especially useful in the welding of refractory metals.

A still further object is to provide, in a seam welding apparatus, an improved electrode wheel and means for chilling the same.

Other objects and advantages will be obvious from the specification and the claims and from the accompanying drawing illustrative of the invention.

In the drawing,

FIGURE 1 is a diagrammatic view of portions of a resistance seam-welding machine provided with the electrode wheels and shield of the present invention;

FIGURE 2 is a partial sectional elevational view of one of the electrode wheels; and FIGURE 3 is a side view of a modified form of the lower electrode wheel and shield.

With initial reference to FIGURES 1 and 2, the two wheels 70, 71 of a resistance seam welding machine are mounted on parallel shafts joined in a fixed lower arm 73 and an upper arm 72 movable by an actuator 74 operable for varying the spacing between the wheels and driving the upper shaft. As shown, each wheel has two opposed faces and a rim. Welding current is supplied to the shafts through brushes (not shown), while the upper shaft 75 (FIGURE 2) is driven by gearing (not shown) meshing with a gear 76 rigidly mounted on the upper shaft. The reservoir 77 (FIGURE 1) contains a liquid, normally gaseous fluid which is supplied through inlet lines 78, 79, 80 and valves 81, 82 to the wheels 70, 71 through their respective shafts; excess fluid can flow out of the wheels through outlet tubes 83, 84 under control of valves 110, 111. Except at the workpiece-engaging portions of their edges, the faces and all the rims of the wheels 70, 71 preferably are covered by respective ice shields 112, 113 rigidly mounted on the arms 72, 73.

As shown in FIGURE 2, the upper wheel 70 is hollow, as is the shaft 75 on whose end the wheel is rigidly mounted. The inlet tube 79 has an end portion which enters and is rigidly mounted in the arm 72 and extends through and along the axis of the shaft into the wheel 70. A suitable seal 114 is provided about the tube 79 at the location of its entry into the wheel 70 to prevent leakage. One or more openings 115 in the tube end communicate with the hollow interior of the wheel 70, which interior constitutes an expansion chamber 116. One or more openings 117 in the front face of the wheel 70 lead from the expansion chamber 116 into the interior of the shield 112; a similar opening or openings 118 lead through the wheel rear face into the shaft cavity 119 outside the tube 79. The inner end of the shaft 75 is rotatably retained by the housing 72, into which the outlet tube 83 opens at a point in communication, as through shaft opening 122, with shaft cavity 119. Suitable means 120 seal between the housing 72 and inner end of the shaft 75.

The lower wheel 71 (FIGURE 1) is similar to the upper wheel 70 except that it need not be supplied with drive means. In both, cryogenic liquid is supplied through a central inlet tube as at 79 (FIGURE 2). Much if not all this water-free liquid (a liquified gas) is vaporized in the electrode wheel 70 or 71 and passes through the front-face opening 117 (see FIGURE 2) to fill the ice shield 112 or 113 with a dry atmosphere which prevents icing of the wheel 70 or 71. Although a very thin film of ice could be tolerated on the wheels 70, 71, its presence at the wheel edges is generally undesirable and is prohibited where the ice is so thick as to prevent electrical conductance through the wheel edges. If it is desired to reduce the gaseous flow into, for example, the shield 112, valve 110 (FIGURE 1) is opened to allow escape of some of the gas through tube 83. In the event that some ice should form on the periphery of the wheel 70, this is removed by a deicer blade 121 mounted on the shield 112 and rubbing against the rotating rim of the wheel 70.

An optional form of the cryogenically cooled bottom electrode wheel is shown in FIGURE 3. Cryogenic liquid supplied directly into the ice shield 113A through tube 79A at least partially fills the shield and lies in chilling contact with the lower wheel 71A. As before, the shield 113A covers all of both faces and the rim of the wheel except a workpiece-engaging peripheral portion.

The method of joining electrically conductive parts by seam welding comprises providing a reservoir, as described, containing a liquid, normally gaseous fluid chosen from the group comprising hydrogen, helium, argon, nitrogen, oxygen, air, and carbon dioxide. A factor determining the choice is the electrode wheel temperature desired. Research data indicate that the electrode temperatures producible by liquid nitrogen are low enough for satisfactory seam welding operations on molybdenum, a metal in which satisfactory seam welds have not previously been obtained. While liquid nitrogen readily lowers the electrode wheel temperature to the range of −300° F., still lower temperatures are obtainable by use, for example, of liquid helium or hydrogen. An electrode temperature at least as low as −100° F. is necessary for practice of the invention, and this temperature is obtainable by use of liquid carbon dioxide.

The fluid from the reservoir 77 employed to chill wheels 70, 71 is preferably still in liquid form on reaching the wheels. It is preferable that the liquid be largely if not completely vaporized before leaving the wheels, for efficient chilling is obtained in this way with economy of use of the liquified gas from the reservoir. The chilling of the wheels 70, 71 is begun while they are spaced from the parts to be welded in order that the parts, and especially their interface or area of mutual contact traversed by the wheels, will not initially be greatly cooled but will remain in the vicinity of room temperature. While the electrical conductivity of the wheel is thus greatly increased, resistance at the interface between the workpieces is not significantly lowered.

Since the passage of the cryogenic fluid through them quickly plunges the wheels far below the freezing point of water, atmospheric water tends to form a coating of ice on the wheels which renders their edges non-conductive. Icing is eliminated by maintaining a dry atmosphere about the wheels. The dry atmosphere is maintained throughout the seam welding operation.

The chilled wheels 70, 71 are brought together to compress the work-piece between them, and the welding current is passed through the parts via the wheels while at least the wheel 70 is driven to pass the work between them. Cooling of the outer surfaces of the workpieces of course begins immediately upon their being contacted by the wheels, and this is in no way undesirable but instead is of benefit in obtaining a good weld. Welding is best started, in a given location, before the cold strikes through the workpieces enough to chill them greatly at the interface between them. In this way, the welding current encounters a greatly lowered resistance at the contacts between the wheels and work pieces, but resistance at the work-to-work interface is not greatly lowered, and the latter area thus is first to rise to a melting temperature. Temperature rise occurs, of course, in the wheels at and near their contacts with the workpieces, but the rate and amount of heat evolution in the wheels is much lowered by the greatly increased conductivity of the wheels. Furthermore, the wheel edges are very cold before initiation of and contain to be cryogenically chilled during the flow of current; and even though the temperature rises during current flow in the particular portion of the wheel edge in contact with the workpiece at a given instant, the rise is not enough to produce softening of the wheel material. As a consequence, the problems of wheel deformation and sticking are alleviated when seam welding molybdenum or even tungsten. The extent and nature of recrystallization are a function of the time the nugget remains at a recrystallizing temperature. The longer this time, the larger is the region within the welded part which is raised, by thermal conductance of heat away from the nugget, to a recrystallizing temperature, and the larger are the crystals produced. Generally deleterious in any metal, this recrystallization is especially undesirable in molybdenum, in which the high thermal conductivity and melting point result in a very large and excessively brittle and weak recrystallized area when an attempt is made to employ previous seam welding methods. In consequence of this weakness, spot welding experience, for example, has shown that even the nugget often is stronger than the surrounding portions of the heat-affected zone, for tension shear loads consistently result in failure of parts outside of (rather than within) the nugget. Because of the chilling action of the electrode wheels 70, 71 on the workpieces and the outflows of cold gas against the workpieces from the ice shields 112, 113 of the present device, the weld areas of the workpiece are quickly quenched, and the time during which the hottest part of the molybdenum is at a temperature capable of supporting recrystallization is very brief. As a result, the maximum distance from the nugget throughout which the molybdenum is raised to a recrystallizing temperature is much smaller. Furthermore, there is less change within even this small zone, for there is less time for crystal growth and re-orientation. As a consequence, the original strength of the molybdenum parts is not significantly impaired as it would be by recrystallization extensive in both area and nature. Besides the weakness and brittleness engendered by extensive change in crystal form itself at high temperatures, the deleterious effects of the collection of impurities at the grain boundaries in the metal are important, for such impurities (oxides, nitrides, carbides, etc.) greatly increase brittleness. In cold-working the metal, these collections are broken up; but they re-form upon the metal being raised, for a sufficient time, to a recrystallizing temperature. By virtue of the quick quenching of the present method, there is not enough time for this deleterious formation to progress very far toward completion, and much of the ductility and strength of the metal is preserved in the heat-affected area. The tendency toward cracking in the seam-welded area is also much reduced.

Using the present method, satisfactory seam welds are possible in molybdenum and also in columbium. Electrode sticking is entirely eliminated and failure under shear loads tends to be within (rather than outside) the nugget. Nuggets of good penetration are formed in tungsten without the usual tendency toward shattering, and satisfactory seam welds are obtained in tantalum. The method enables the ready seam welding together of parts of pure copper, and its usefulness is contemplated in the seam welding of non-metallic but conductive materials such as plastics, cermets, and the like incorporating a conductive material.

It will be evident that various modifications, beyond those shown and described herein, are possible within the arrangement and construction of the steps and components of the invention without departing from the scope thereof.

We claim:

1. In a resistance seam welding device having electrode wheels provided with inner cavities and connecting means for establishing communication between said cavities and a source of fluid, each of said wheels having two opposed faces and a rim, the combination with said wheels and connecting means of:
   a respective shield enclosing substantially all of both faces and all except a workpiece-engaging peripheral portion of the rim of each wheel;
   at least one opening providing communication between the interior of each wheel and the interior of the associated shield;
   and a reservoir connected into the connecting means and containing a liquid, normally gaseous fluid.

2. In a resistance seam welding device having electrode wheels provided with inner cavities and connecting means for establishing communication between said cavities and a source of fluid, each of said wheels having two opposed faces and a rim, the combination with said wheels and connecting means of:
   a respective shield enclosing substantially all of both faces and all except a workpiece-engaging peripheral portion of the rim of each wheel;
   at least one opening providing communication between the interior of each wheel and the interior of the associated shield;
   a reservoir connected into the connecting means and containing a liquid, normally gaseous fluid;
   a respective outlet conduit associated with each wheel;
   and at least one opening in each wheel providing communication between the wheel interior and the associated outlet conduit.

3. In a resistance seam-welding device having a housing with an opening, a hollow shaft rotatably mounted in the housing and having an outer end extending through the opening to the exterior of the housing, and an electrode wheel having two opposed faces and a rim with an inner cavity and mounted on the outer end of the shaft, the combination with the wheel, shaft, and housing of:
   a shield enclosing substantially all of both faces and all except a workpiece-engaging peripheral portion of the rim of the wheel;
   a reservoir containing a liquid, normally gaseous fluid;
   a tube sealingly extending into the housing and axially within the shaft into the wheel cavity, the tube having an opening into the cavity and being connected into the reservoir;
   means governing flow of the liquid, normally gaseous fluid through the tube;
   at least one opening providing communication between the wheel cavity and the interior of the shield;
   at least one opening providing communication between the wheel cavity and the interior of the shaft;
   an outlet conduit having communication with the interior of the shaft;
   and means governing fluid flow through the outlet conduit.

4. The combination set forth in claim 3 and further including an ice scraper mounted on the ice shield and slidably bearing against the periphery of the wheel.

References Cited by the Examiner

UNITED STATES PATENTS

| 2,040,877 | 5/36 | Quarnstrom | 219—83 |
| 2,416,374 | 2/47 | Brunberg | 219—120 |
| 2,448,396 | 8/48 | Schebeler et al. | 219—120 |
| 2,536,726 | 1/51 | Cornwall | 219—120 |

FOREIGN PATENTS

| 756,807 | 4/52 | Germany. |

OTHER REFERENCES

"Molybdenum," "Metal Industry," Nov. 18, 1949 (pp. 439–41).

"Mallory Resistance Welding Data Book" (Fourth Ed., 1951) pages 276, 277. P. R. Mallory and Co., Indianapolis, Ind.

Stanley: "Resistance Welding" (1951), page 156, McGraw-Hill Book Co., New York, N.Y.

RICHARD M. WOOD, *Primary Examiner.*